United States Patent [19]
Hedley

[11] Patent Number: 6,164,863
[45] Date of Patent: Dec. 26, 2000

[54] ROTATING LOCKING ARRANGEMENT

[75] Inventor: Robert Ian Hedley, South South Wales, Australia

[73] Assignee: Hedweld Engineering Pty Limited, New South Wales, Australia

[21] Appl. No.: 09/073,136

[22] Filed: May 5, 1998

[30] Foreign Application Priority Data

May 6, 1997 [AU] Australia ............................ P06633/97

[51] Int. Cl.⁷ .................................................. F16B 1/00
[52] U.S. Cl. ...................... 403/348; 403/350; 403/319; 292/54; 24/597
[58] Field of Search .................... 403/348, 350, 403/322.1, 328, 319, 316, 315, 408.1; 292/54, 4, 5, 210; 24/590, 597; 446/103; 434/401

[56] References Cited

U.S. PATENT DOCUMENTS

| | | | |
|---|---|---|---|
| 2,284,847 | 6/1942 | Raymond | 403/350 |
| 2,448,547 | 9/1948 | Purdy | 403/319 |
| 3,600,735 | 8/1971 | Jerabek | 403/348 X |
| 5,261,758 | 11/1993 | Vranish | 403/348 |
| 5,271,303 | 12/1993 | Chatham | 403/319 X |
| 5,626,435 | 5/1997 | Wohlhuter | 403/348 |

*Primary Examiner*—Lynne H. Browne
*Assistant Examiner*—John R. Cottingham
*Attorney, Agent, or Firm*—Hopgood, Calimafde, Kalil & Judlowe

[57] ABSTRACT

A locking arrangement for releasably securing a first member to a second member is provided in which a surface of the first member has anchors projecting therefrom with a lip portion of each anchor transversely extending from an extremity of each anchor. A surface of the second member has a cutout portion defining an opening adapted to lockingly engage an anchor. At least a portion of the cutout has a tongue at the opening thereof shaped to be positioned underneath the lip portion of an anchor to effect locking engagement thereof. During use, a surface of each of the first and second members is arranged by positioning the cutout portion on the anchor following which one member is rotated relative to the other member to thereby effect engagement of the tongue underneath the lip portion. A keeper is then inserted in at least a part of the cutout not occupied by an anchor to releasably secure the first member to the second member, wherein movement between the members is inhibited. An advantage of the invention is that a plurality of components can be locked in a row.

10 Claims, 6 Drawing Sheets

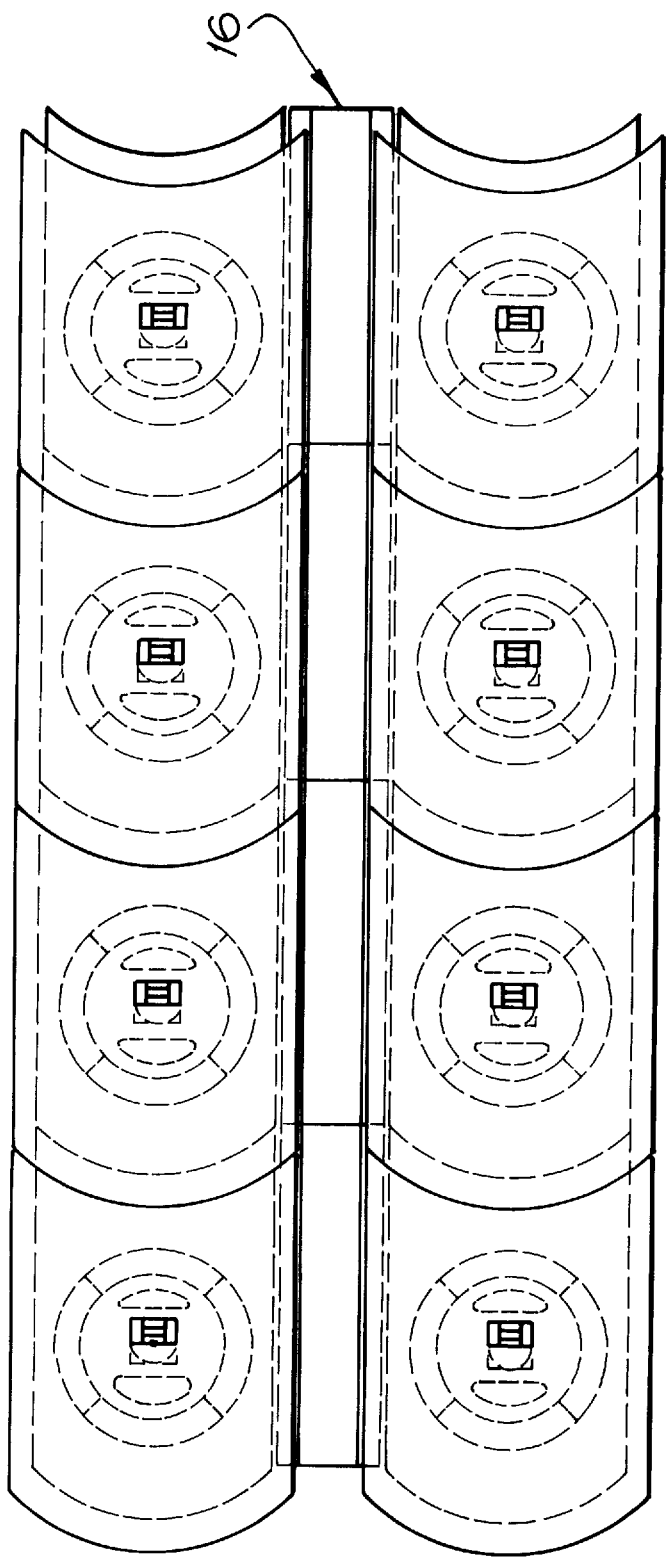
FIG. 6(a)
FIG. 6(b)
FIG. 6(c)

ROTATING LOCKING ARRANGEMENT

BACKGROUND OF THE INVENTION

The present invention relates to a locking arrangement for releasably securing two members, and in particular, to a locking arrangement whereby the members are rotated one with respect to the other. The locking arrangement of the present invention is particularly suitable for adapting wear plates to equipment, such as in the mining industries, in washeries, or, for crushing, etc.

DESCRIPTION OF THE PRIOR ART

The present invention provides advantages over the locking arrangements described in the Applicant's earlier Patents/Applications, including U.S. Pat. No. 5,129,168 (AU 52082/90), and U.S. Pat. No. 5,588,768 (AU 68914/94).

The Applicant's earlier Patents/Applications relate to locking arrangements for locking a plurality of plate members to a base surface. The base surface is provided with a plurality of locking anchors provided in spaced apart relationship thereon. Each of the plate members is provided with at least one anchor receiving member thereon, such that each anchor receiving means is adapted to engage one of said anchors. The edges of each plate members are adapted to abut with the edges of adjacent plate members such that the plate members are prevented from disengagement from the anchors.

The Applicant's U.S. Pat. No. 5,129,168 provided a "retaining means", whilst the Applicant's later U.S. Pat. No. 5,588,768 eliminated the "retaining means" by using a "keeper".

SUMMARY OF THE INVENTION

The present invention seeks to provide a locking arrangement which is suitable for similar purposes as the Applicant's earlier Patents/Applications, but which provides an alternative means for locking.

The present invention also seeks to provide a locking arrangement which provides for a more secure locking of the members than in the earlier Patents/Applications.

The present invention also seeks to provide a locking arrangement whereby members can be quickly and easily locked into position.

The present invention also seeks to provide a locking arrangement whereby the possibility of disengagement is further minimised.

In one broad form, the present invention provides a locking arrangement for releasably securing a first member to a second member, a surface of said first member having anchor means projecting therefrom with a lip portion(s) of said anchor means transversely extending from an extremity of at least a portion(s) of said anchor means, a surface of said second member having a cutout portion(s) defining an opening adapted to lockingly engage said anchor means, at least a portion of said cutout having a tongue(s) around the opening thereof shaped to be positioned underneath said lip portion(s) of said anchor means, such that during use, a surface of each of said first and second members is aligned by positioning said cutout about said anchor means, and then rotating one member relative to the other to thereby effect engagement of said tongue underneath said lip portion, a keeper then being inserted in at least a part of said cutout not occupied by said anchor means to releasably secure said first member to said second member, wherein movement between said members is then inhibited.

Preferably, said anchor means and said cutout portion are each of substantially complementary symmetrical shape.

Also preferably, said anchor means and said cutout means are substantially circular in cross-section and, wherein each of said lip portions and tongues are provided in substantially opposite quadrant portions thereof.

In its most preferred form, each of said first and second members is rotated by 90°.

Preferably, said keeper is a spool shaped, comprising an axle part having enlarged disc-like end portions.

Also preferably, wherein said keeper further comprises locking means, to retain said keeper in position, when said members are engaged.

Preferably, said locking means is comprised of a resilient portion intermediate a pair of end caps, said locking means being provided axially within said keeper such that said end caps are biased outwardly of said keeper to abut against the surface of said anchor means.

Preferably, said end caps are adapted to be received in shaped divets provided in said anchor means.

Preferably, to prevent the ingress of dirt, etc., within said part of said cutout not occupied by said anchor means, after insertion of said keeper, a plug or filler is provided therein.

Also preferably, said keeper may be removed from said members by means of a tool adapted to engage said axle part of said keeper.

Also preferably, the invention may further comprise providing an infill bar between adjacent rows of locking arrangements.

BRIEF DESCRIPTION OF THE DRAWINGS

The present invention will become more fully understood from the following detailed description of the preferred but non-limiting embodiment thereof, described in connection with the accompanying drawings, wherein:

FIG. 6(b) and 6(c) show plan and elevational views of the infill bar.

DETAILED DESCRIPTION OF PREFERRED EMBODIMENTS

Figure 1A:
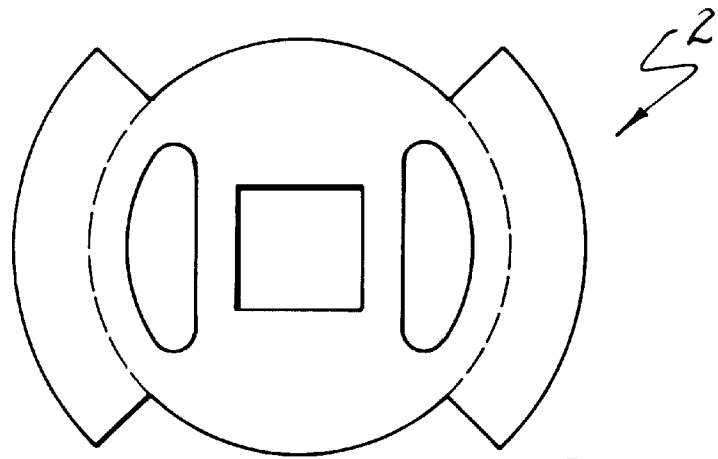
FIG. 1 illustrates, in FIGS. 1(a), 1(b) and 1(c), respectively, plan, elevational and perspective views of a block base, or first member, in accordance with the present invention.
Figure 1B:
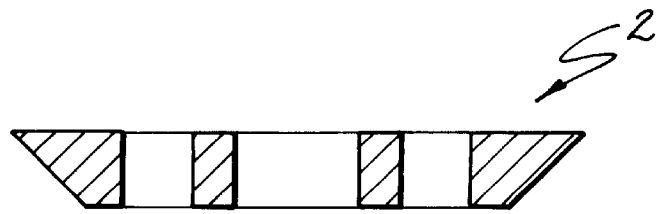

Throughout the drawings, like numerals will be used to identify similar features, except where expressly otherwise indicated.

As shown, in the drawings, there is provided a locking arrangement, generally designated by the numeral 1, which comprises an anchor means 2 projecting from a first member 3, and a second member 4 which is adapted to be engaged with the first member 3. The second member is provided with a cutout portion 5 to cooperate with the anchor means 2. Also provided is a locking clip 6, a "keeper", which, once the first and second members, 3 and 4, are provided in position, is installed to releasably secure said first member to said second member.

Figure 1C:
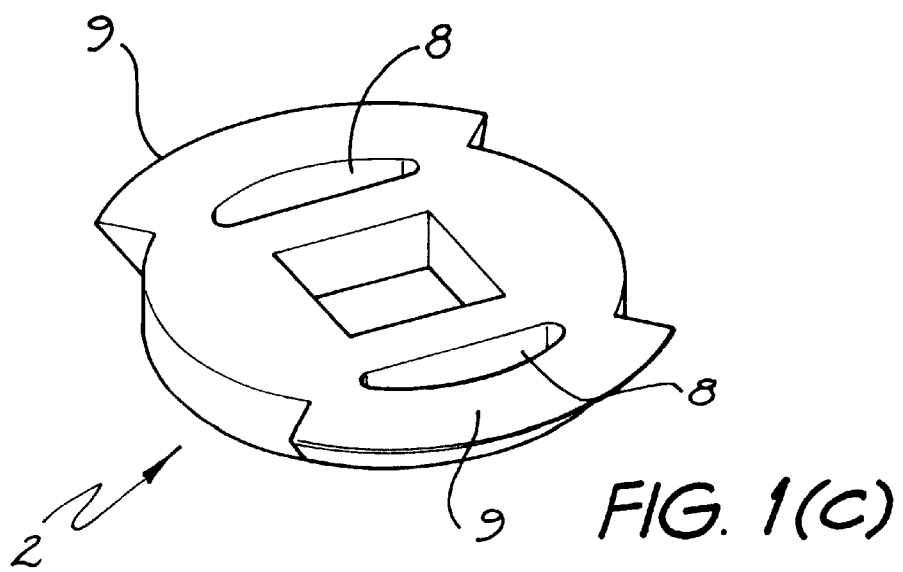
Figure 2A:
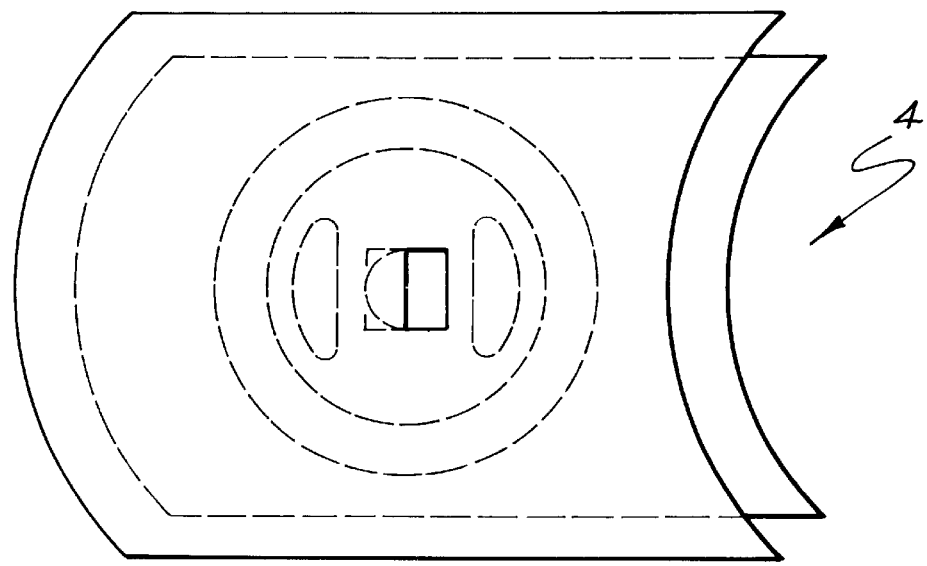
FIG. 2 illustrates, in FIGS. 2(a), 2(b) and 2(c), respectively, plan, elevational, and perspective views of the wear block or set member of the present invention.
Figure 2B:
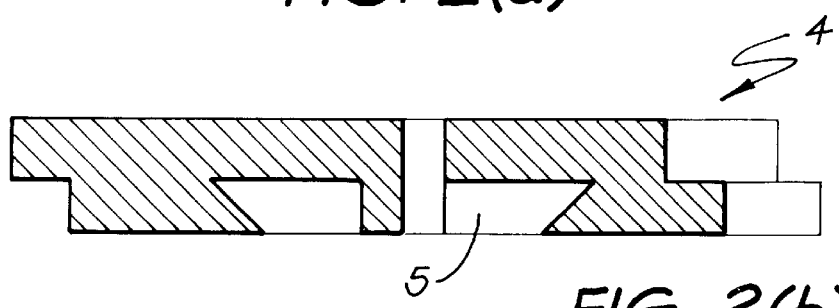
Figure 2C:
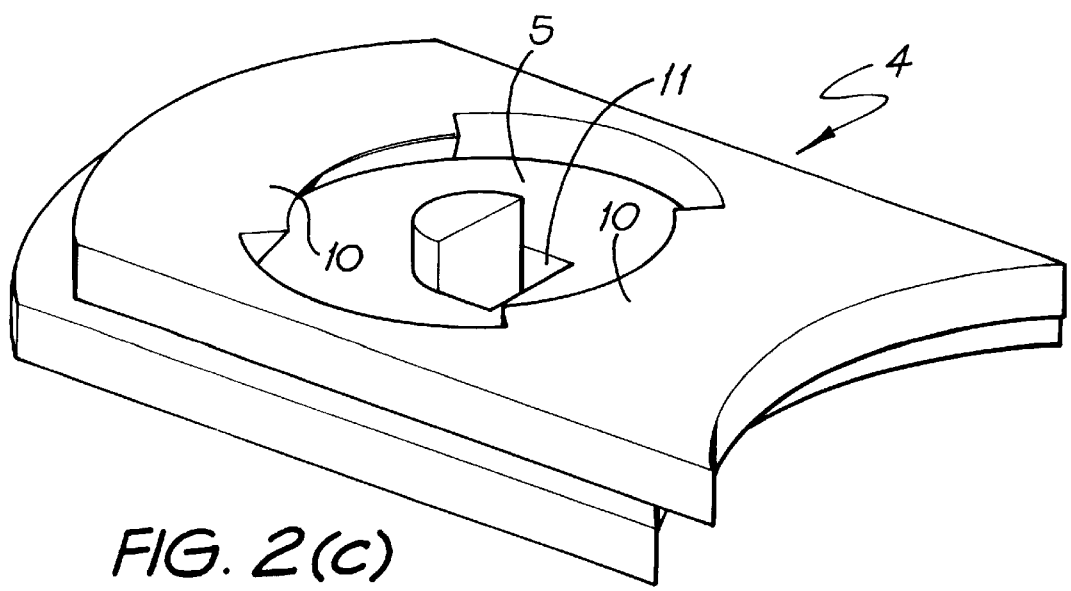

As perhaps best illustrated in FIG. 1(c), the anchor means 2, is attached to the first member 3, by welds or the like 7. The welds or the like 7 may attach the anchor or be provided via orifice 8. The embodiment of the anchor or block base 2 shown in FIG. 1(c) is provided with a pair of lips 9 extending from the extremity of opposite sides of the anchor 2. Whilst such a preferred embodiment described herein shows such a configuration of a pair of lips 9 provided in substantially opposite quadrant portions of a substantially circular anchor means 2, it will be appreciated that any number of lips 9 may be provided, provided they correspond with the cooperating surfaces of the wear block or second member 4 (as will be hereinafter described).

The second member or wear block 4 is provided with a cutout portion 5 which, as previously mentioned, is correspondingly shaped to receive the block base or anchor 2. That is, it is provided with a pair of tongues 10 which, once in their locking position, are adapted to cooperate with the lip portions 9 of the anchor 2, such that disengagement of the two members is prevented. An orifice 11 is provided to receive a locking clip or 'keeper' (as will be hereinafter described) such that when the anchor 2 and the member 4 are engaged in the lockable position, movement between the anchor 2 and the member 4 is thereafter inhibited.

Figure 3A:
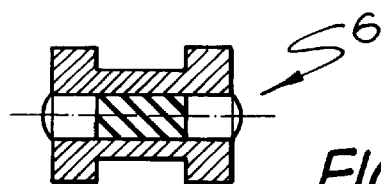
FIG. 3 illustrates, in FIGS. 3(a) and 3(b), respectively, a cross-sectional view and a partially cut-away perspective view of a locking clip or keeper, in accordance with the present invention.
Figure 3B:
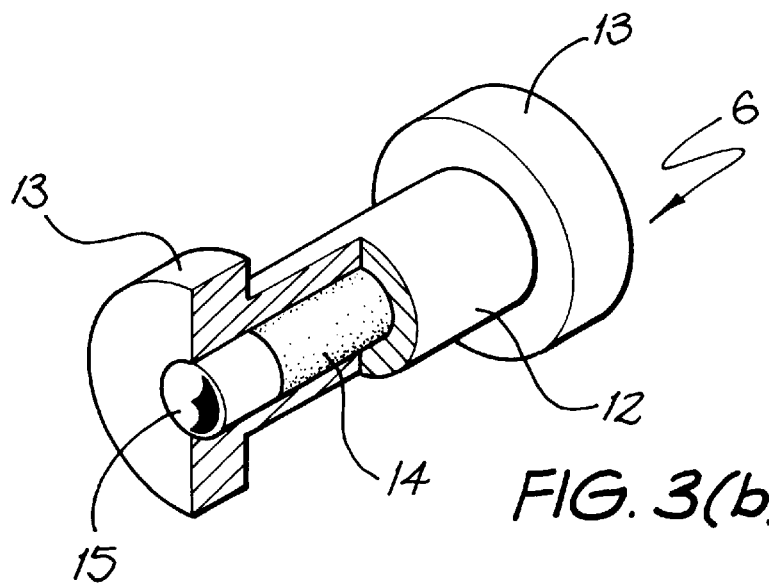

The locking clip 6 may be embodied in a variety of configurations. The locking clip or keeper 6 shown in FIG. 3 may be 'spool shaped', comprising an axle portion 12 having a pair of enlarged disc like ends 13. Centrally provided within the locking clip, a rubber compound, or the like 14, may be provided to give outward bias to a pair of locking caps 15. The locking caps 15 preferably engage appropriately positioned divets in the anchor 2 (see FIG. 4(c)).

Figure 4A:
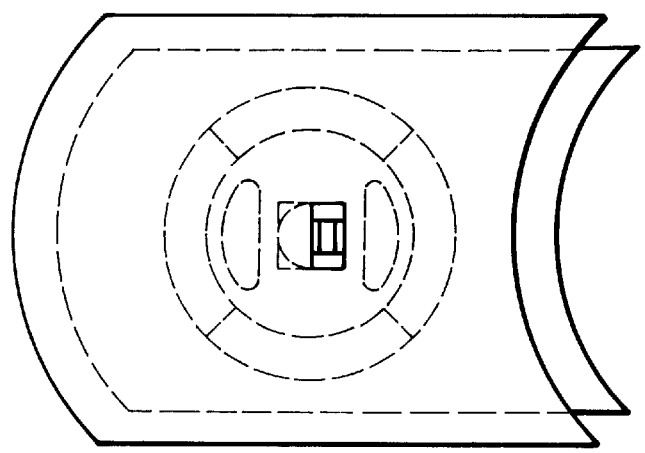
FIG. 4 illustrates, in FIGS. 4(a), 4(b) and 4(c), respectively, plan, elevational, and partially cut-away cross-sectional views of the various components in assembled format; and, FIG. 5 illustrates a plan view of a series of three members locked in position, and a fourth member being shown in its engaging position, prior to rotation; and, FIG. 6(a) illustrates two rows of locking arrangements, incorporating an infill bar therebetween, whilst
Figure 4B:
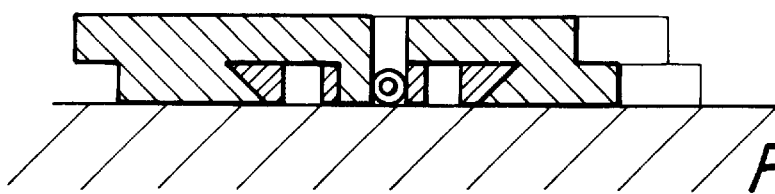
Figure 4C:
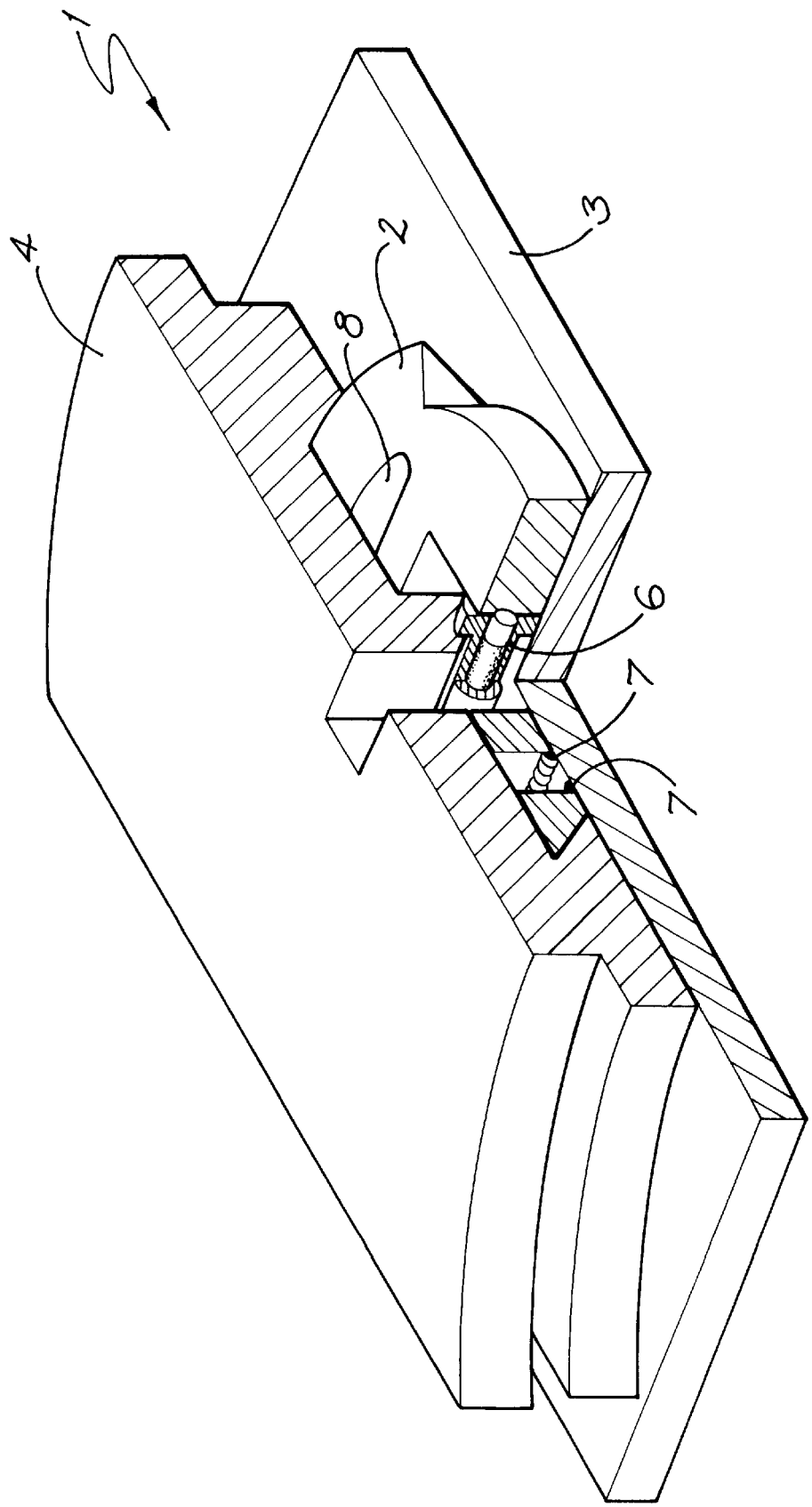
Figure 5:
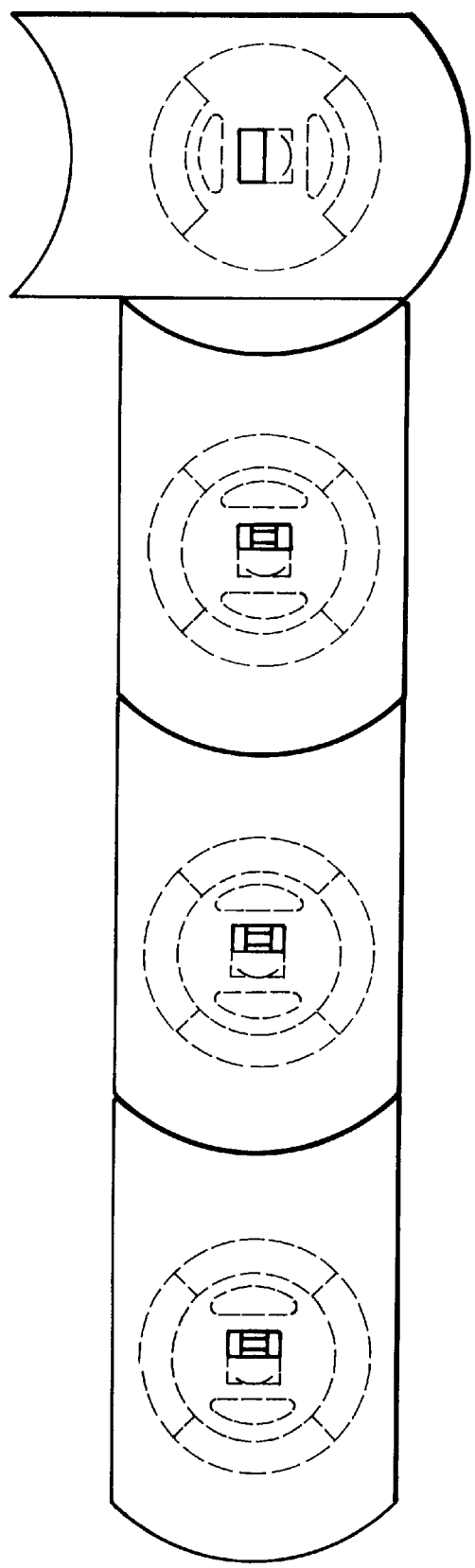

The interengagement of the various components of the invention is best illustrated in FIGS. 4, 5 and 6. FIG. 5 shows a series of three interengaged (locked) members, with a fourth member shown in the 'engaging' position, that is, prior to being rotated to the locked position. It should be noted in viewing FIG. 5 that the anchor or base member 2 could be provided either in the orientation shown or at 90° thereto. FIG. 6(a) illustrates two rows of interengaged members, having an infill bar 16 provided therebetween. FIGS. 6(b) and 6(c) show plan and elevational views, respectively, of the infill bar of FIG. 6(a).

In use, each of the second members 4 is provided substantially over and about a respective anchor 2, and then rotated such that the tongues 10 and lips 9 cooperate. The embodiment illustrated shows two oppositely located tongues and lips provided in opposite quadrants of a substantially circular anchor 2, such that 90° rotation is required to effect locking of the two members 2 and 3. It will be appreciated that more than two 'tongues' and 'lips' may be provided on each member, such that rotation of the members by angles other than 90° may be required to affect the locking engagement.

The locking clip or 'keeper' may also be varied in shape and configuration, as will be appreciated by persons skilled in the art. The particular locking clip shown, however, enables it's easy insertion and removal within the cutout 11. For example, the locking clip may be easily engaged by an appropriate tool about the central axle part 12 of the locking clip 6, and likewise a similar tool can be used for removal of same.

The provision of the biased locking caps or pins centrally in the locking clip to be preferably provided within correspondingly shaped divets in the anchor ensures that the locking clip will not fall out. Also, once the locking clip is provided into the orifice 11, it will be appreciated that it may be preferable to thereafter insert some form of plug or filler material thereover to ensure that dirt and the like does not enter the remaining portion of the orifice 11.

It will be understood that, in use, a variety of applications for the locking members are envisaged. Pertinent arrangements might, for example, include use of the locking arrangement in attaching wear resistant plates to earthmoving, mining, washery or crushing equipment.

It would be appreciated that a variety of shapes of the anchor and second member are envisaged, whereby such a rotational locking engagement is still achieved.

It will also be appreciated that the members of the invention may either be separately cast, or, the members could be cut from sheet material.

It should therefore be appreciated that a variety of variations and modifications may be envisaged to the invention. All such variations and modifications which become apparent to persons skilled in the art should be considered to fall within the spirit and scope of the invention as hereinbefore broadly described.

What is claimed is:

1. A locking arrangement for releasably securing a plurality of components to a surface,
    said surface having a plurality of anchors projecting therefrom in spaced apart relationship comprising at least one row of said anchors,
    each of said anchors having a lip extending from an extremity of at least one portion thereof
    each component having a cutout portion defining an opening with spaced tongues therearound having a complementary shape with respect to each of said anchors and being cooperably connectable thereto via a cooperable attachment of said tongues and said lips,
    each of said component being shaped such that when each component is fitted to a corresponding anchor and rotated thereon, it is locked in place by locking engagement of said lips and said tongues,
    said locking arrangement including a keeper for releasably securing at least a final component in a row by preventing rotation and disengagement of said components.

2. A locking arrangement as claimed in claim 1, wherein each said anchor and said cutout portion are substantially circular in cross-section and, wherein each of said lips and tongues are provided in substantially opposite quadrant portions thereof.

3. A locking arrangement as claimed in claim 2, wherein each of said first and second members is rotated 90°.

4. A locking arrangement as claimed in claim 2, wherein said keeper is spool shaped, including an axle part having enlarged disc-like end portions.

5. A locking arrangement as claimed in claim 2, wherein said keeper further comprises locking means, to retain said keeper in position, when said members are engaged.

6. A locking arrangement as claimed in claim 2, wherein said locking means is comprised of a resilient portion intermediate a pair of end caps, said locking means being provided axially within said keeper such that said end caps are biased outwardly of said keeper to abut against the surface of said anchor means.

7. A locking arrangement as claimed in claim 6, wherein said end caps are adapted to be received in shaped divots provided in said anchor means.

8. A locking arrangement as claimed in claim 2, wherein to prevent the ingress of dirt within said part of said cutout not occupied by said anchor means, after insertion of said keeper, a plug or filler is provided therein.

9. A locking arrangement as claimed in claim 2, wherein said keeper may be removed from said members by means of a tool adapted to engage said axle part of said keeper.

10. A locking arrangement as claimed in claim 2, further including an infill bar disposed between adjacent rows of locking arrangements.

\* \* \* \* \*